United States Patent
Nishino

(10) Patent No.: US 9,806,645 B2
(45) Date of Patent: Oct. 31, 2017

(54) ROBOT SYSTEM

(71) Applicant: DENSO WAVE INCORPORATED, Chita-gun, Aichi-pref. (JP)

(72) Inventor: Hideyuki Nishino, Chita-gun (JP)

(73) Assignee: DENSO WAVE INCORPORATED, Aichi-Pref. (JP)

(*) Notice: Subject to any disclaimer, the term of this patent is extended or adjusted under 35 U.S.C. 154(b) by 0 days.

(21) Appl. No.: 15/340,618

(22) Filed: Nov. 1, 2016

(65) Prior Publication Data
US 2017/0155344 A1 Jun. 1, 2017

(30) Foreign Application Priority Data

Nov. 30, 2015 (JP) .................. 2015-233458

(51) Int. Cl.
*H02P 3/22* (2006.01)
*G05B 9/02* (2006.01)
*H02P 27/06* (2006.01)
*H02P 29/024* (2016.01)

(52) U.S. Cl.
CPC .................. *H02P 3/22* (2013.01); *G05B 9/02* (2013.01); *H02P 27/06* (2013.01); *H02P 29/0243* (2016.02)

(58) Field of Classification Search
CPC .... H02P 3/12; H02P 3/22; H02P 21/36; H02P 3/00; H02P 29/024

USPC .................................................. 318/515, 516
See application file for complete search history.

(56) References Cited

U.S. PATENT DOCUMENTS

2008/0017439 A1* 1/2008 Sawada ................ B62D 5/0472
 180/446
2014/0368150 A1* 12/2014 Furukawa ............ B62D 5/0403
 318/564
2016/0329840 A1* 11/2016 Mori ........................ H02P 15/00

FOREIGN PATENT DOCUMENTS

JP 2014-087874 A 5/2014

* cited by examiner

*Primary Examiner* — Bickey Dhakal
(74) *Attorney, Agent, or Firm* — Oliff PLC

(57) ABSTRACT

A robot system includes: a robot; a three-phase inverter having a high side switch and a low side switch connected in series; a power line electrically connecting a connection point between the high side switch and the low side switch to a stator winding of a motor; a short circuit path that electrically connects at least two lines of the power line; a brake switch arranged in the short circuit path to change the short circuit path to an open state or a closed state; a break detector that detects a disconnection of the power line; and an operation part that operates the brake switch from the open state to the closed state, when the break detector detects the disconnection.

9 Claims, 5 Drawing Sheets

ROBOT SYSTEM

CROSS REFERENCE TO RELATED APPLICATION

This application is based on Japanese Patent Application No. 2015-233458 filed on Nov. 30, 2015, the disclosure of which is incorporated herein by reference in its entirety.

TECHNICAL FIELD

The present disclosure relates to a robot system.

BACKGROUND

JP 2014-87874 A describes a robot system including a three-phase inverter electrically connected to a stator winding of a three-phase motor through a power line. In the robot system, a regeneration resistor and a switch connected in series are connected in parallel to an input side of the inverter.

When stopping the robot, the switch is turned on to form a closed circuit including the stator winding, the regeneration resistor, and the switch. A regeneration current generated when the robot is operated to slowdown can be made to emit as thermal energy by the regeneration resistor, such that a dynamic brake can be applied to the motor. Thereby, the robot can be slowdown and stopped.

SUMMARY

A power line connecting an inverter to a motor may be broken for example when a movable unit such as conveyor moves, on which a base portion of the robot is fixed. If the power line is broken, the electric power supplied to the motor stops, and what is called a free-run state occurs in which the motor continues rotating due to inertia.

The free-run state should be restricted by applying a dynamic brake to the motor using the regeneration resistor. However, if the electric connection between the inverter and the motor is intercepted by a disconnection in the power line, the dynamic brake cannot be applied to the motor, because a closed circuit cannot be formed, which includes the regeneration resistor connected to the input side of the inverter and the stator winding. It is difficult to quickly stop the robot when a disconnection is generated in the power line.

It is an object of the present disclosure to provide a robot system in which a free-run state of a motor is avoidable when a power line which connects an inverter and a motor is broken.

According to an aspect of the present disclosure, a robot system includes a robot, a three-phase inverter, a three-phase power line, a short circuit path, a brake switch, a break detector, and an operation part. The robot includes a base portion disposed at a robot setting position, a plurality of rotation parts connected rotatably relative to the base portion, and a three-phase motor arranged to drive a rotation shaft of the respective rotation part. The three-phase inverter has a high side switch and a low side switch connected in series. The three-phase power line electrically connects a connection point between the high side switch and the low side switch to a stator winding of the motor. The power line connects the inverter and the stator winding through a lead-in port defined in the base portion. The short circuit path electrically connects at least two phase lines of the power line. The short circuit path is located between the stator winding and the lead-in port. The brake switch is arranged in the short circuit path to change the short circuit path to an open state or a closed state. The break detector detects a disconnection of the power line. The operation part operates the brake switch from the open state to the closed state, when the break detector detects the disconnection.

The robot system includes the three-phase motor corresponding to the rotation shaft of each rotation part of the robot, and the three-phase inverter in which the high side switch and the low side switch are connected in series. For each of the three phases, the stator winding of the motor is electrically connected to the connection point between the high side switch and the low side switch by the power line. Further, the power line connects the inverter to the stator winding through the lead-in port of the base portion of the robot.

In case where the base portion is fixed on a movable member such as conveyor, when the movable member moves, the power line may be pulled. At this time, the power line which connects the inverter and the motor may be broken. Since the power line connects the inverter and the stator winding through the lead-in port of the base portion, the break of the power line is likely generated between the inverter and the lead-in port.

Then, the robot system has the short circuit path located between the lead-in port and the stator winding to electrically connect at least two phase lines of the power line, and the brake switch disposed in the short circuit path to open or close the short circuit path. When a disconnection of the power line is detected by the break detector, the operation part operates to change the brake switch from the open state to the closed state. For this reason, even if the power line is disconnected, a closed circuit can be formed by the stator winding, the power line, and the brake switch. Therefore, the motor can be slowdown and stopped by applying dynamic brake to the motor. If the power line is broken at a position between the stator winding and the inverter, the motor can be restricted from having a free-run state, and the robot can be stopped quickly.

The short circuit path electrically connects at least two phase lines of the three-phase power line, and the at least two phase lines are respectively connected to stator windings of the same motor.

The robot system may further include an interception switch disposed between the lead-in port and the short circuit path in each line of the three-phase power line to change the each line to an open state or a closed state. The operation part operates the interception switch from the closed state to the open state, when the break detector detects the disconnection of the power line.

When one phase line of the three-phase power line is broken, electric power can be supplied from the inverter to the motor through the other two phase lines. At this time, there is concern that time period taken for stopping rotation of the motor (operation of the robot) may become long while it is required to quickly decelerate the robot.

Then, the robot system includes the interception switch disposed between the lead-in port and the short circuit path in each line of the three-phase power line to change the each line to an open state or a closed state. The operation part operates the interception switch from the closed state to the open state, when the break detector detects the disconnection of the power line. For this reason, dynamic brake can be applied to the motor in a state where the electric supply from the inverter to the motor is intercepted. Thereby, the time period necessary for stopping rotation of the motor from the applying of the dynamic brake to the motor can be shortened.

The robot system may further include an auxiliary switch mechanically interlocked with the interception switch to open and close. The auxiliary switch is closed when the interception switch is in the open state, and the auxiliary switch is open when the interception switch is in the closed state. The interception switch is a normally open-type switch. The interception switch is closed when electric power is supplied to an interception magnetization coil. The interception switch is open when electric supply is not supplied to the interception magnetization coil. The brake switch is a normally open-type switch. The brake switch is closed when electric power is supplied to a brake magnetization coil. The brake switch is open when electric supply is not supplied to the brake magnetization coil. A closed circuit is defined to include a direct-current power supply, the auxiliary switch, and the brake magnetization coil. The operation part intercepts a supply of electric power to the interception magnetization coil, when the break detector detects the disconnection.

The robot system has the interception switch, the brake switch, and the auxiliary switch. The closed circuit is formed by the direct-current power supply, the auxiliary switch, and the brake magnetization coil.

When electric power is supplied to the interception magnetization coil, the normally open-type interception switch changes to the closed state. Thereby, the supply of electric supply to the motor from the inverter is permitted. When electric power is supplied to the interception magnetization coil, the auxiliary switch mechanically interlocked with the interception switch is made into the open state, such that the supply of electric power from the direct-current power supply to the brake magnetization coil through the auxiliary switch is intercepted. For this reason, the normally open-type brake switch is in the open state, and the closed circuit is not formed by the stator winding, the power line, and the brake switch, such that dynamic brake is not applied.

When the supply of electric power to the interception magnetization coil is intercepted, the interception switch is in the open state. Thereby, the electric supply to the motor from the inverter is intercepted. Moreover, when the electric supply to the interception magnetization coil is intercepted, the auxiliary switch mechanically interlocked with the interception switch changes to the closed state, such that electric power is supplied through the auxiliary switch to the brake magnetization coil from the direct-current power supply. For this reason, the brake switch change to the closed state, and a closed circuit is formed by the stator winding, the power line, and the brake switch, such that dynamic brake can be operated.

When a disconnection in the power line is detected by the break detector, the switching operation to the interception magnetization coil effects both of the operation which changes the interception switch from the closed state to the open state, and the operation which changes the brake switch from the open state to the closed state. For this reason, both of the interception in the electric supply to the motor and the applying of dynamic brake to the motor can be quickly carried out when the power line is broken.

The short circuit path may electrically connect three phase lines of the power line, which are respectively connected to stator windings of the same three-phase motor.

Because the brake switch is disposed in each short circuit path which connects the three phase lines mutually, current resulting from an induction voltage generated in each stator winding can flow through the closed circuit for dynamic brake, such that thermal energy can be emitted. Accordingly, the brake force by dynamic brake can be increased, and the time period taken for stopping operation of the robot can be shortened, compared with a case where the short circuit path connects two phase lines of the power line.

The three-phase motor may be a first motor which drives the rotation shaft of a first rotation part of the plurality of rotation parts. The three-phase inverter may be a first inverter arranged to correspond to the first motor. The three-phase power line may be a first three-phase power line electrically connecting a first stator winding of the first motor to the connection point between the high side switch and the low side switch of the first inverter. The robot system may further include: a second motor which drives the rotation shaft of a second rotation part of the plurality of rotation parts; a second inverter arranged to correspond to the second motor; and a second three-phase power line electrically connecting a second stator winding of the second motor to the connection point between the high side switch and the low side switch of the second inverter. The break detector detects at least one disconnection of the first three-phase power line and the second three-phase power line, and the short circuit path electrically connects at least two phase lines of the first power line to at least two phase lines of the second power line, respectively, without an overlap.

The robot system may include the short circuit path which electrically connects at least two phase lines of the first power line to at least two phase lines of the second power line, respectively, without an overlap. Accordingly, the number of the stator windings in the closed circuit for dynamic brake can be increased, compared with a case where the short circuit path electrically connects at least two phase lines of the power line which are respectively connected to the stator windings of the same motor. As a result, the resistance of the closed circuit can be increased, and more current resulting from the induction voltage of the stator winding flows, such that more thermal energy can be emitted. Therefore, the brake force by dynamic brake can be increased, and the time period taken for stopping the operation of the robot can be shortened.

The robot system may further include: a first interception switch disposed between the lead-in port and the short circuit path in each line of the first three-phase power line to change the each line to the open state or the closed state; and a second interception switch disposed between the lead-in port and the short circuit path in each line of the second three-phase power line to change the each line to the open state or the closed state. The operation part may operate the first interception switch and the second interception switch from the closed state to the open state, when the break detector detects the disconnection.

Therefore, dynamic brake can be applied to the first/second motor in a state where the electric supply from the first/second inverter to the first/second motor is intercepted. Thereby, time period taken from the applying of dynamic brake to the first/second motor to the stop in the rotation of the first/second motor can be shortened.

The robot system may further include an auxiliary switch mechanically interlocked with a target switch to open and close. The target switch is at least one of the first interception switch and the second interception switch. The auxiliary switch is closed when the target switch is in the open state, and the auxiliary switch is open when the target switch is in the closed state. Each of the first interception switch and the second interception switch is a normally open-type switch that is closed when electric power is supplied to an interception magnetization coil and that is open when electric supply is not supplied to the interception magnetization coil. The brake switch is a normally open-type switch. The brake switch is closed when electric power is supplied to a brake magnetization coil. The brake switch is open when electric power is not supplied to the brake magnetization coil. A closed circuit is defined to include a direct-current power supply, the auxiliary switch, and the brake magnetization coil. The operation part intercepts a supply of electric power to the interception magnetization coil, when the break detector detects the disconnection.

The robot system includes the first and second interception switches, the brake switch, and the auxiliary switch. At least one of the first and second interception switches is the target switch, and the auxiliary switch is mechanically interlocked with the target switch to open and close. The closed circuit is defined by the direct-current power supply, the auxiliary switch, and the brake magnetization coil.

When electric power is supplied to the interception magnetization coil, the normally open-type first/second interception switch is changed to the closed state. Thereby, the electric supply to the first/second motor from the first/second inverter is allowed. Moreover, when electric power is supplied to the interception magnetization coil, the auxiliary switch mechanically interlocked with the target switch is made in the open state, and the electric supply to the brake magnetization coil through the auxiliary switch from the direct-current power supply is intercepted. For this reason, the normally open-type brake switch is in the open state. Since a closed circuit is not formed by the first/second stator winding, the first/second power line, and the brake switch, dynamic brake is not applied.

When the electric supply to the interception magnetization coil is intercepted, the first/second interception switch is made in the open state. Thereby, the electric supply to the first/second motor from the first/second inverter is intercepted. Moreover, when the electric supply to the interception magnetization coil is intercepted, the auxiliary switch mechanically interlocked with the target switch changes into the closed state, and electric power is supplied through the auxiliary switch to the brake magnetization coil from the direct-current power supply. For this reason, the brake switch changes into the closed state. A closed circuit including the first/second stator winding, the first/second power line, and the brake switch is formed, such that dynamic brake can be applied.

In case where at least one disconnection in the first power line and the second power line is detected by the break detector, when a switching operation is performed to the interception magnetization coil, the first/second interception switch changes from the closed state to the open state, and the brake switch changes from the open state to the closed state. For this reason, when at least one of the first power line and the second power line is broken, the interception in the electric supply to the first/second motor and the applying of dynamic brake to the first/second motor can be simultaneously and quickly carried out.

The short circuit path may electrically connect three phase lines of the first power line to three phase lines of the second power line, respectively, without an overlap.

The brake switch is disposed on each short circuit path which electrically connects phase lines of the first power line to phase lines of the second power line, respectively, without an overlap. For this reason, the current resulting from the induction voltage generated in each of the first and second three-phase stator windings can be made to flow through the closed circuit for dynamic brake, such that thermal energy can be emitted. In this case, the brake force by dynamic brake can be increased, and time period taken for stopping the operation of the robot can be shortened more, compared with a case where the short circuit path electrically connects two phase lines of the first power line to two phase lines of the second power line, respectively, without an overlap.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
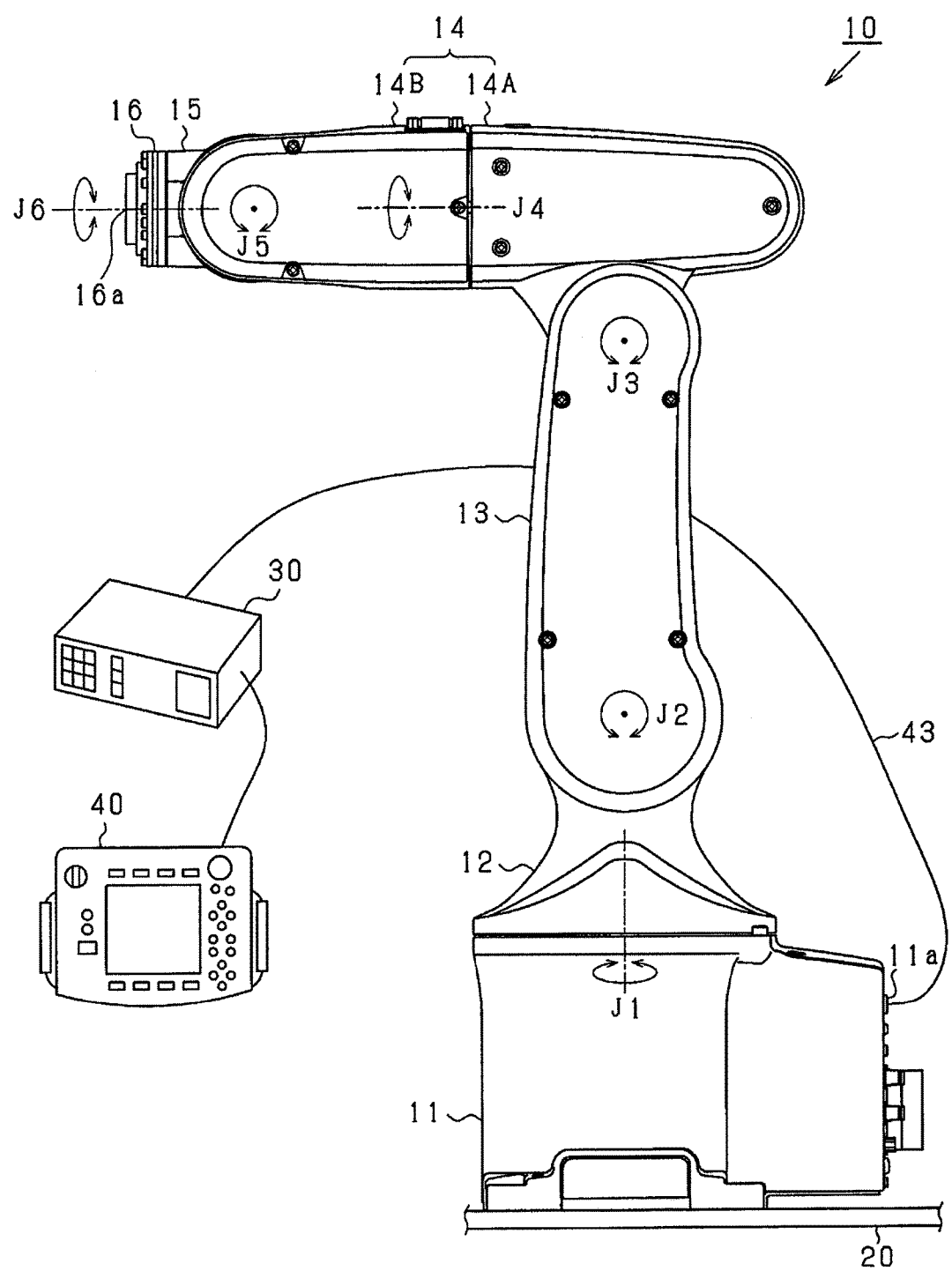
FIG. 1 is a view illustrating a robot system according to a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A robot system according to a first embodiment is described referring to the drawings. A robot of this embodiment is used in an assembly system such as machine assembly factory, for example, as an industrial robot.

The robot system of this embodiment is explained with reference to FIG. 1.

As shown in FIG. 1, a robot 10 of the robot system has plural rotation parts and a joint which sequentially connects the adjacent rotation parts to be rotatable relative to each other. The robot 10 of this embodiment is, for example, a perpendicular multi-joint robot with six axes.

The robot 10 has a base portion 11 and a first rotation part 12 above the base portion 11. An arm of the robot 10 includes a lower arm 13, an upper arm 14, a wrist part 15, a hand part 16 in addition to the first rotation part 12. The base portion 11 is disposed on a movable member 20 such as conveyor installed in a production line, in this embodiment. When the movable member 20 moves, the base portion 11 also moves.

The first rotation part 12 is equivalent to a root part of the arm opposite from a tip end of the arm. The first rotation part 12 is rotatable horizontally around a first axis J1 extending in the vertical direction as a rotation center. A lower end part of the lower arm 13 corresponding to a second rotation part is connected to the first rotation part 12 to be rotatable clockwise or counterclockwise around a second axis J2 extending in the horizontal direction as a rotation center. The upper arm 14 is connected to the upper end of the lower arm 13 to be rotatable clockwise or counterclockwise around a third axis J3 extending in the horizontal direction as a rotation center. The upper arm 14 has two arm parts, e.g., a distal arm and a proximal arm (rotating around the third axis J3 as a rotation center on the joint side). The proximal arm is referred to a first top arm 14A corresponding to a third rotation part. The distal arm is referred to a second top arm 14B corresponding to a fourth rotation part. The second top arm 14B rotates around a fourth axis J4 extending in the longitudinal direction of the upper arm 14 as a rotation center, and is rotatable in a torsion direction with respect to the first top arm 14A.

The wrist part 15 is disposed at the tip end of the second top arm 14B as a fifth rotation part. The wrist part 15 rotates around a fifth axis J5 extending in the horizontal direction as a rotation center, and is rotatable with respect to the second top arm 14B. The hand part 16 is disposed at the tip end of the wrist part 15 as a sixth rotation part. A work, tool, etc. is attached to the hand part 16. The hand part 16 rotates around a sixth axis J6 that is the central line as a rotation center, and is rotatable in the torsion direction. The central point 16a of the hand part 16 is referred to a tool center point (TCP) as a control point.

Figure 2:
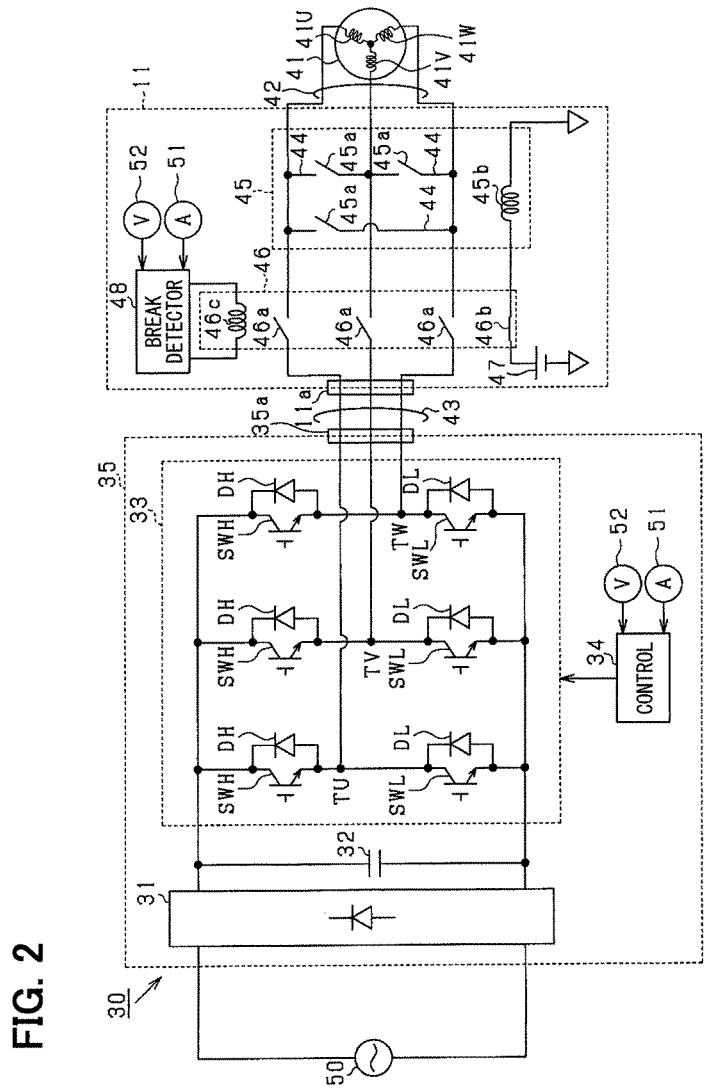
FIG. 2 is a diagram illustrating an electric configuration of the robot system of the first embodiment.

Each rotation part of the robot 10 is driven by the corresponding motor 41 (refer to FIG. 2). The motor 41 can be rotated in both (right and reverse) directions, and each rotation part is driven by the motor 41 on the basis of a starting point position.

The robot system further includes a controller 30 which controls the robot 10, and a teaching pendant 40 electrically connected to the controller 30. The pendant 40 includes a microcomputer with CPU, ROM, and RAM, various kinds of manual operation keys, and a display. The pendant 40 is able to communicate with the controller 30. An operator can do manual operation of the pendant 40, and can create, correct, and register the operation program of the robot 10, and set various parameters. A teaching refers to, for example, a correction in the operation program. In the teaching, a point through which TCP passes in operation is taught. The operator can operate the robot 10 based on the operation program through the controller 30.

An electric configuration of the robot system is explained with reference to FIG. 2.

The controller 30 includes a rectifier 31 which changes AC voltage outputted from an external power supply 50 (commercial power) into DC voltage, and a smoothing capacitor 32 which smooths the DC voltage outputted from the rectifier 31. The controller 30 further includes a three-phase inverter 33 which changes the DC voltage outputted from the rectifier 31 into AC voltage to be impressed to each stator winding 41U, 41V, 41W of the motor 41. The motor 41 and the inverter 33 are individually disposed corresponding to each of the rotation parts of the robot 10.

The inverter 33 includes three pairs of high side switch SWH and low side switch SWL connected in series. A first end of the U phase stator winding 41U is connected to a connection point between the U phase high side switch SWH and the U phase low side switch SWL. A first end of the V phase stator winding 41V is connected to a connection point between the V phase high side switch SWH and the V phase low side switch SWL. A first end of the W phase stator winding 41W is connected to a connection point between the W-phase high side switch SWH and the W phase low side switch SWL. Second ends of the stator windings 41U, 41V, 41W are connected to each other at the neutral point. When the high side switch SWH and the low side switch SWL are alternately turned on, the inverter 33 changes the DC voltage outputted from the rectifier 31 into AC voltage to be impressed to the stator winding. Thereby, phase current flows in the respective stator winding with a phase shifted by 120 degrees (electrical angle).

In this embodiment, each of the switches SWH, SWL is a semiconductor switching element for controlling voltage such as IGBT. A freewheel diode DH, DL is anti-parallel connected to each switch SWH, SWL.

The controller 30 further includes a control part 34 which controls the motor for driving the robot 10. The control part 34 is mainly made of a microprocessor. The control part 34 outputs a drive signal driving the high side switch SWH and the low side switch SWL to the inverter 33, such that the control amount (for example, revolving speed) of the motor 41 provided corresponding to each rotation axis is controlled to the instruction value. In this embodiment, the rectifier 31, the inverter 33, and the control part 34 are received in a common case 35.

The respective first end of the stator winding 41U, 41V, 41W is electrically connected to the respective connection point TU, TV, TW between the high side switch SWH and the low side switch SWL through the power line 42. The power line 42 connects the controller 30 and the base portion 11 to each other through a lead-in port 35a defined in the case 35 and a lead-in port 11a defined in the base portion 11. As shown in FIG. 1, the power line 42 defined between the lead-in port 35a and the lead-in port 11a is referred to a cable 43 between the case 35 and the base portion 11.

In an accommodation space defined in the base portion 11, the three phase lines of the power line 42 are electrically connected to each other by three short circuit paths 44. A contactor 45 and a safety switch 46 are received in the accommodation space. The contactor 45 has a brake switch 45a disposed in each short circuit path 44 to open or close each short circuit path 44, and a brake magnetization coil 45b. When electric power is supplied to the brake magnetization coil 45b, the brake switch 45a is in a closed state. When electric supply to the brake magnetization coil 45b is stopped, the brake switch 45a is made in an open state. That is, the brake switch 45a is normally open-type switch.

The safety switch 46 has a normally open-type interception switch 46a arranged between the lead-in port 11a of the base portion 11 and the contactor 45 relative to each of the three phase lines of the power line 42. The normally open-type interception switch 46a opens and closes a main contact. The safety switch 46 has a normally-closed type auxiliary switch 46b mechanically interlocked with the interception switch 46a to open and close an auxiliary contact, and an interception magnetization coil 46c. When the interception switch 46a is in the open state, the auxiliary switch 46b is changed into a closed state. When the interception switch 46a is in the closed state, the auxiliary switch 46b is changed into the open state. That is, the safety switch 46 has a mirror contact structure. The anode of the direct-current power supply 47 is connected to the first end of the auxiliary switch 46b, and the cathode of the direct-current power supply 47 is connected to the ground. The second end of the auxiliary switch 46b is connected to the ground through the brake magnetization coil 45b. That is, the closed circuit is formed of the auxiliary switch 46b, the brake magnetization coil 45b, and the direct-current power supply 47.

The break detector 48 is received in the base portion 11. The break detector 48 detects a disconnection of the power line 42. When a disconnection of the power line 42 is detected, the electric supply to the interception magnetization coil 46c is intercepted.

The detection values of the current sensor 51 and the voltage sensor 52 are inputted into the break detector 48. The current sensor 51 detects at least two phase currents, of the three phase currents flowing into the motor 41. The current sensor 51 is located to be able to detect a phase current flowing through the power line 42, for example, between the contactor 45 and the motor 41. The voltage sensor 52 detects three-phase voltage of the motor 41. The voltage sensor 52 is located to be able to detect a phase voltage of the power line 42, for example, between the contactor 45 and the motor 41. The detection values of the current sensor 51 and the voltage sensor 52 are inputted also into the control part 34.

The break detector 48 has a back check function to diagnose the existence of abnormalities in the brake switch 45a, the interception switch 46a, and the auxiliary switch 46b.

The break detector 48 detects disconnection of the power line 42 based on the detection value of at least one of the current sensor 51 and the voltage sensor 52. As a disconnection detection technique, it is determined that a disconnection has arisen, for example, when the sum of the phase currents (magnitude of the vector which is the sum of phase current vectors) is shifted from zero based on the detection value of the current sensor 51. Alternatively, it is determined that a disconnection has arisen, when the sum of the phase voltages (magnitude of the vector which is the sum of phase voltage vectors) is shifted from zero based on the detection value of the voltage sensor 52.

When the break detector 48 detects disconnection of the power line 42, the electric supply to the motor 41 from the inverter 33 is intercepted, and a dynamic brake is applied to the motor 41 to stop the robot 10.

A processing performed by the break detector 48 is explained with reference to FIG. 3. This processing is repeatedly performed by the break detector 48, for example, at a predetermined cycle.

In a series of the processing, it is first determined whether a disconnection of the power line 42 is detected in S10.

When it determines that a disconnection is not detected in S10, electric power is supplied to the interception magnetization coil 46c in S11. When electric power is supplied to the interception magnetization coil 46c, the normally open-type interception switch 46a is in a closed state. Thereby, the electric supply to the motor 41 from the inverter 33 is permitted. Moreover, when electric power is supplied to the interception magnetization coil 46c, the auxiliary switch 46b mechanically interlocked with the interception switch 46a is made into the open state, and the electric supply from the direct-current power supply 47 via the auxiliary switch 46b to the brake magnetization coil 45b is intercepted. For this reason, the normally open-type brake switch 45a is made into the open state, such that a closed circuit is not formed by the stator winding 41U, 41V, 41W, the power line 42, and the brake switch 45a.

When it determines that a disconnection is detected in S10, the electric supply to the interception magnetization coil 46c is intercepted in S12 (corresponding to an operation part). In this case, the interception switch 46a is made into the open state, and the electric supply to the motor 41 from the inverter 33 is intercepted. Moreover, when the electric supply to the interception magnetization coil 46c is intercepted, the auxiliary switch 46b mechanically interlocked with the interception switch 46a is changed into a closed state, and electric power is supplied from the direct-current power supply 47 through the auxiliary switch 46b to the brake magnetization coil 45b. For this reason, the brake switch 45a is changed into a closed state, and a closed circuit including the stator winding 41U, 41V, 41W, the power line 42, and the brake switch 45a is formed, such that dynamic brake can be applied to the motor 41. Thereby, the robot 10 can be slowdown and stopped, and a free-run state can be prevented.

Figure 4:
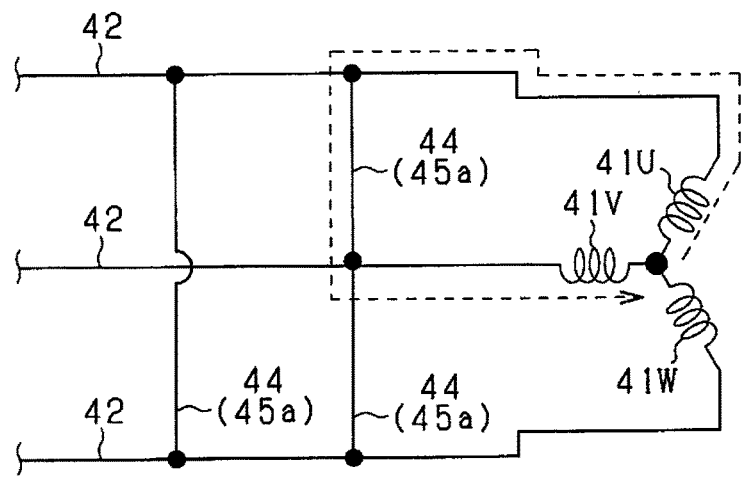
FIG. 4 is a view illustrating a closed circuit for dynamic brake of the first embodiment.

A dashed line in FIG. 4 represents the closed circuit defined by the stator winding 41U, the power line 42, the brake switch 45a, and the stator winding 41U.

This embodiment provides the following advantages.

The interception switch 46a is arranged between the lead-in port 11a of the base portion 11 and the motor 41, in the three-phase power line 42. When disconnection of the power line 42 is detected by the break detector 48, the brake switch 45a is changed to the closed state. For this reason, when disconnection is detected, dynamic brake can be applied to the motor 41, and a free-run state can be prevented.

Furthermore, in addition to changing the brake switch 45a to the closed state, the interception switch 46a is changed to the open state. For this reason, dynamic brake can be applied to the motor 41 in the state where the electric supply to the motor 41 from the inverter 33 is intercepted. Thereby, time period taken from the applying of dynamic brake to the stop in rotation of the motor 41 can be shortened.

The interception switch 46a is the normally open-type switch. Specifically, when electric power is supplied to the interception magnetization coil 46c, the interception switch 46a is changed into a closed state. When the electric supply to the interception magnetization coil 46c is intercepted, the interception switch 46a is changed into the open state.

The brake switch 45a is the normally open-type switch. Specifically, when electric power is supplied to the brake magnetization coil 45b, the brake switch 45a is changed into a closed state. When the electric supply to the brake magnetization coil 45b is intercepted, the brake switch 45a is changed into the open state.

The auxiliary switch 46b is mechanically interlocked with the interception switch 46a to open and close. When the interception switch 46a is made into the open state, the auxiliary switch 46b is changed into the closed state. When the interception switch 46a is made into the closed state, the auxiliary switch 46b is changed into the open state.

A closed circuit is formed including the direct-current power supply 47, the auxiliary switch 46b, and the brake magnetization coil 45b.

When a disconnection is detected by the break detector 48, the interception magnetization coil 46c is operated to change from the power supply state to the power interception state. The single switch operation to the interception magnetization coil 46c simultaneously carries out both the operation which changes the interception switch 46a from the closed state to the open state, and the operation which changes the brake switch 45a from the open state to the closed state. For this reason, when the power line 42 is broken, the interception in the electric supply to the motor 41 and the dynamic brake can be quickly carried out.

The short circuit path 44 electrically connects the three phase lines of the power line 42 to each other, while the three phase lines are respectively connected to the stator windings 41U, 41V, 41W. The brake switch 45a is disposed in each short circuit path 44. For this reason, the closed circuit for dynamic brake can consume the currents resulting from the induction voltage generated in each of the stator windings 41U, 41V, 41W. Therefore, the brake force by dynamic brake can be increased, and time period taken for stopping the operation of the robot 10 can be shortened more.

The contactor 45, the safety switch 46, the direct-current power supply 47, and the break detector 48 are held in the base portion 11. For this reason, the number of cables connecting the case 35 and the base portion 11 can be reduced, compared with a case where the control part 34 performs the back check of the brake switch 45a, the interception switch 46a, and the auxiliary switch 46b.

Second Embodiment

Figure 5:
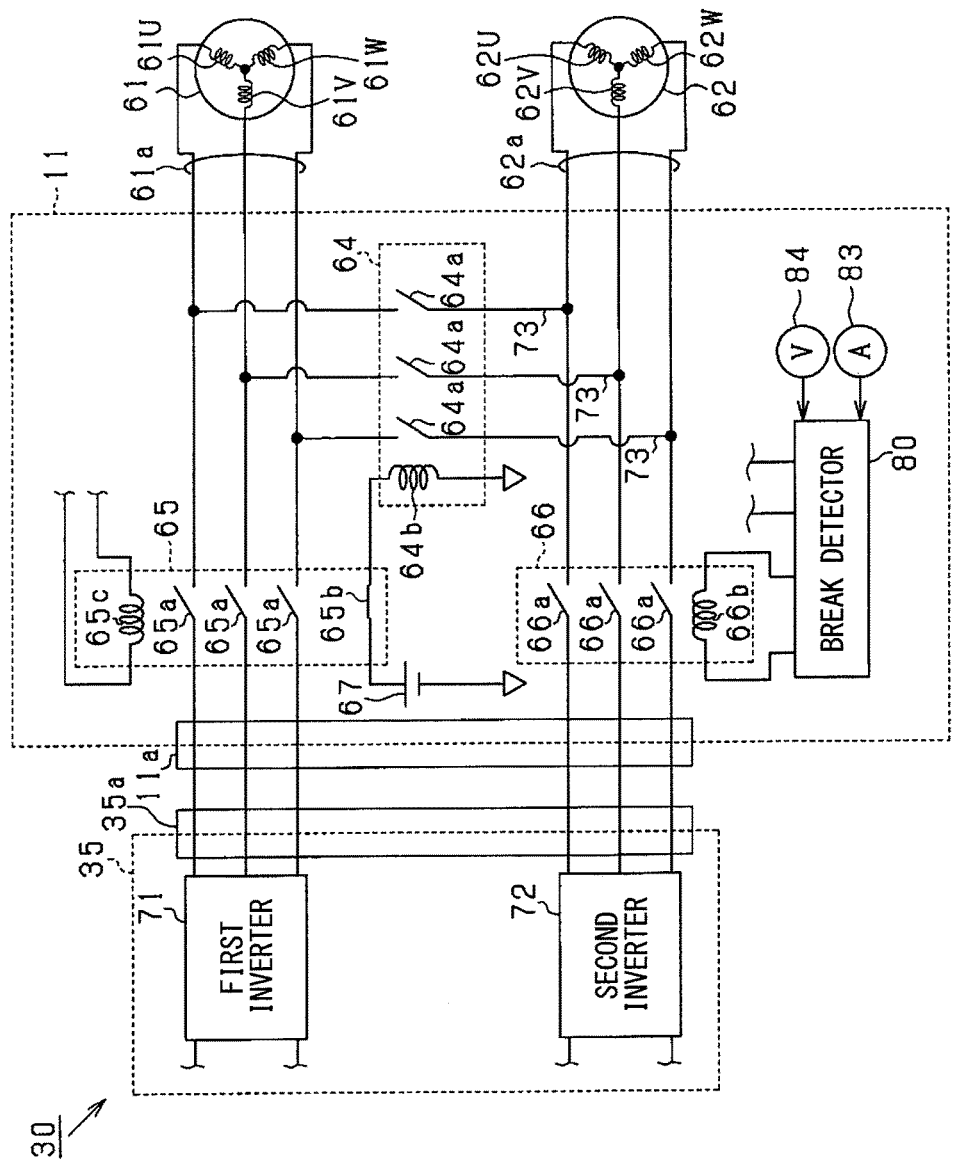
FIG. 5 is a diagram illustrating an electric configuration of a robot system according to a second embodiment.

A second embodiment is described, referring to drawings focusing on differences from the first embodiment. In this embodiment, a closed circuit for dynamic brake is made between two adjacent motors, while the motors 41 are arranged respectively corresponding to the rotation parts of the robot 10. FIG. 5 illustrates two motors, specifically, a first motor 61 and a second motor 62.

The first motor 61 has a first U-phase stator winding 61U, a first V-phase stator winding 61V, and a first W-phase stator winding 61W. The second motor 62 has a second U-phase stator winding 62U, a second V-phase stator winding 62V, and a second W-phase stator winding 62W.

The first inverter 71 is disposed corresponding to the first motor 61. A connection point between a high side switch and a low side switch of the first inverter 71 is electrically connected to a first stator winding of the first three-phase power line 61a.

The second inverter 72 is disposed corresponding to the second motor 62. A connection point between a high side switch and a low side switch of the second inverter 72 is electrically connected to a second stator winding of the second three-phase power line 62a.

The first power line 61a and the second power line 62a connect the controller 30 and the base portion 11 to each other through the lead-in port 35a of the case 35 and the lead-in port 11a of the base portion 11.

In the accommodation space of the base portion 11, three phase lines of the first power line 61a are electrically connected to three phase lines of the second power line 62a by the short circuit path 73, respectively, without an overlap.

The first contactor 64, the safety switch 65, and the second contactor 66 are received in the accommodation space of the base portion 11. The first contactor 64 is disposed on each short circuit path 73, and has the brake switch 64a which opens and closes each short circuit path 73, and the brake magnetization coil 64b. When electric power is supplied to the brake magnetization coil 64b, the brake switch 64a changes into a closed state. When the electric supply to the brake magnetization coil 64b is intercepted, the brake switch 64a changes into open state. That is, the brake switch 64a is a normally open-type switch.

The safety switch 65 has the normally open-type first interception switch 65a (equivalent to a target switch) disposed between the lead-in port 11a of the base portion 11 and the first contactor 64, relative to the three phase lines of the first power line 61a, to open and close a main contact. The safety switch 65 has the normally-closed type auxiliary switch 65b mechanically interlocked with the first interception switch 65a to open and close an auxiliary contact, and the first interception magnetization coil 65c. The auxiliary switch 65b has the mirror contact structure. When the first interception switch 65a is made into the open state, the auxiliary switch 65b changes into a closed state. When the first interception switch 65a is made into a closed state, the auxiliary switch 65b changes into the open state.

The second contactor 66 has the normally open-type second interception switch 66a disposed between the lead-in port 11a of the base portion 11 and the first contactor 64, relative to three phase lines of the second power line 62a, to open and close a main contact, and the second interception magnetization coil 66b.

The anode of the direct-current power supply 67 is connected to the first end of the auxiliary switch 65b, and the cathode of the direct-current power supply 67 is connected to the ground. The second end of the auxiliary switch 65b is connected to the ground through the brake magnetization coil 64b.

The break detector 80 is held in the base portion 11. The break detector 80 detects at least one disconnection in the first power line 61a and the second power line 62a. When disconnection is detected, the electric supply to the first interception magnetization coil 65c and the second interception magnetization coil 66b is intercepted.

The detection value of the current sensor 83 and the voltage sensor 84 is inputted into the break detector 80. The current sensor 83 detects at least two phase currents in each of the first motor 61 and the second motor 62. The voltage sensor 84 detects three phase voltages in each of the first motor 61 and the second motor 62. The disconnection detection technique by the break detector 80 may be the same as the first embodiment.

The processing of the break detector 80 according to the second embodiment is explained.

When it determines that no disconnection is detected, the break detector 80 supplies electric power to the first interception magnetization coil 65c and the second interception magnetization coil 66b. In this case, the normally open-type first and second interception switches 65a and 66a are made into the closed state. Thereby, the electric supply to the first and second motors 61 and 62 from the first and second inverters 71 and 72 is permitted, and the drive control of the robot 10 is made possible.

When electric power is supplied to the first interception magnetization coil 65c and the second interception magnetization coil 66b, the auxiliary switch 65b mechanically interlocked with the first interception switch 65a is made into the open state. The electric supply to the brake magnetization coil 64b through the auxiliary switch 65b from the direct-current power supply 67 is intercepted. For this reason, the normally open-type brake switch 64a is made into the open state. A closed circuit is not formed by the first and second stator winding, the first and second power line 61a and 62a, and the brake switch 64a.

When it determines that a disconnection is detected, the break detector 80 intercepts the electric supply to the first interception magnetization coil 65c and the second interception magnetization coil 66b. In this case, the first and second interception switches 65a and 66a are made into the open state. Thereby, the electric supply to the first and second motors 61 and 62 from the first and second inverters 71 and 72 is intercepted.

When the electric supply to the first interception magnetization coil 65c and the second interception magnetization coil 66b is intercepted, the auxiliary switch 65b mechanically interlocked with the first interception switch 65a changes into a closed state. Electric power is supplied through the auxiliary switch 65b to the brake magnetization coil 64b from the direct-current power supply 67. For this reason, the brake switch 64a changes into a closed state, and a closed circuit is formed including the first and second stator winding, the first and second power line 61a and 62a, and the brake switch 64a, such that dynamic brake can be operated.

According to the second embodiment, when at least one disconnection in the first power line 61a and the second power line 62a is detected by the break detector 80, an operation to switch the first interception magnetization coil 65c and the second interception magnetization coil 66b executes both the operation which changes the first and second interception switches 65a and 66a from the closed state to the open state, and the operation which changes the brakes switch 64a from the open state to the closed state. For this reason, the electric supply to the first and second motors 61 and 62 is quickly intercepted and the dynamic brake can be quickly applied when at least one disconnection is detected in the first power line 61a and the second power line 62a.

Figure 6:
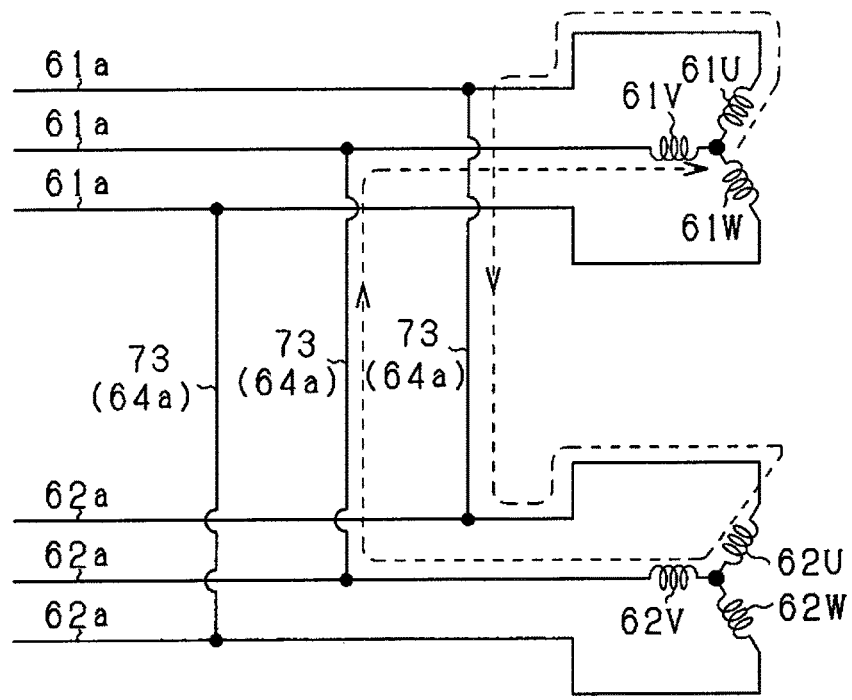
FIG. 6 is a view illustrating a closed circuit for dynamic brake of the second embodiment.

According to the second embodiment, as compared with the first embodiment, the number of stator windings defining the closed circuit for dynamic brake can be increased from two to four. As a result, the resistance of the closed circuit can be increased, and the brake force by dynamic brake can be increased. Therefore, time period taken for stopping operation of the robot 10 can be shortened. A dashed line in FIG. 6 represents a closed circuit defined by the first U phase stator winding 61U, the first power line 61a, the brake switch 64a, the second U phase stator winding 62U, the second V phase stator winding 62V, the second power line 62a, the brake switch 64a, the first power line 61a, and the first V phase stator winding 61V.

Other Embodiment

The above embodiment may be implemented with modifications as follows.

The technique of detecting a disconnection of the power line 42 is not restricted to that described in the first embodiment. For example, when it determines that current flowing through the neutral point is not zero based on the detection value of the current sensor 51, it may be determined that a disconnection has arisen. For example, when it determines that the phase difference between the phase current detected by the current sensor 51 and phase voltage detected by the voltage sensor 52 is larger than or equal to a predetermined value, it may be determined that a disconnection has arisen.

The disconnection detection technique is not limited to be based on the detection value of the current sensor 51 or the voltage sensor 52, and may be based on the detection value of a rotation detecting element such as encoder which detects the rotation angle of each rotation axis of the robot 10. In this case, when it determines that the rotational position information detected by the rotation detecting element is shifted from an instruction position by a predetermined value, it is determined that a disconnection has arisen in the power line 42. This is a technique using the deviation between the detected position and the instruction position because the control point of the robot 10 cannot follow a target point, when disconnection arises.

Figure 7:
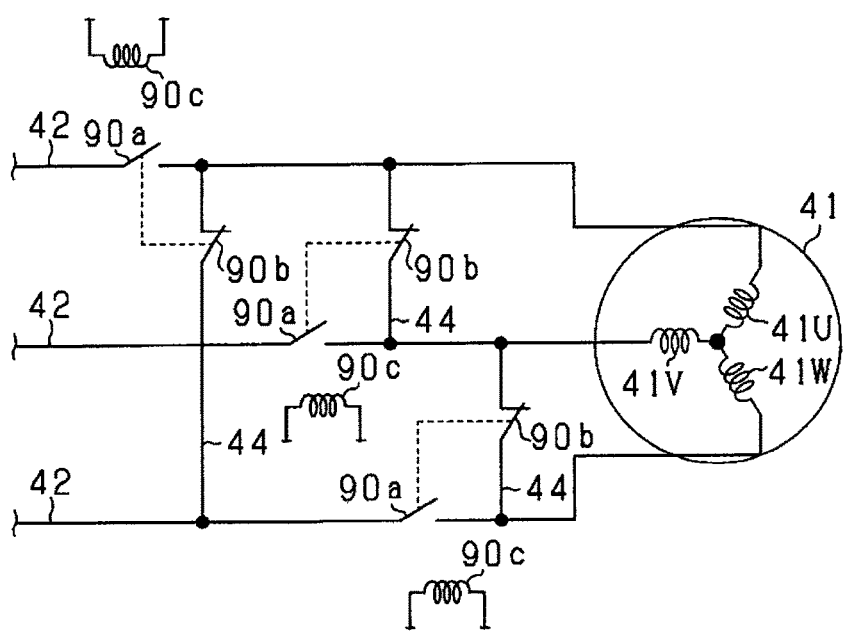
FIG. 7 is a diagram illustrating an electric configuration of a robot system according to other embodiment.

FIG. 7 illustrates a configuration for intercepting the electric supply to the motor 41 from the inverter 33, and for forming a closed circuit for dynamic brake. In FIG. 7, the same reference code is attached to the same composition in FIG. 2, for convenience.

In FIG. 7, a mirror contact structure is realized by an interception switch 90a disposed in each power line 42, and a brake switch 90b disposed in each short circuit path 44. When disconnection of the power line 42 is detected, what is necessary is just to intercept the electric supply to the interception magnetization coil 90c corresponding to the interception switch 90a.

In the first embodiment, only two phase lines of the power line 42 may be electrically connected.

In the second embodiment, only two phase lines of the first power line 61a may be electrically connected to two phase lines of the second power line 62a, respectively without an overlap, by the short circuit path 73.

In the second embodiment, the second interception switch 66a may also be mechanically interlocked with the auxiliary switch 65b, in addition to the first interception switch 65a.

In the second embodiment, the first power line 61a and the second power line 62a are connected at the same phase. Alternatively, the first power line 61a and the second power line 62a may be connected at different phases.

In the first embodiment, the configuration including the contactor 45, the safety switch 46, and the direct-current power supply 47 may be doubled between the lead-in port 11a and the motor 41.

Figure 3:
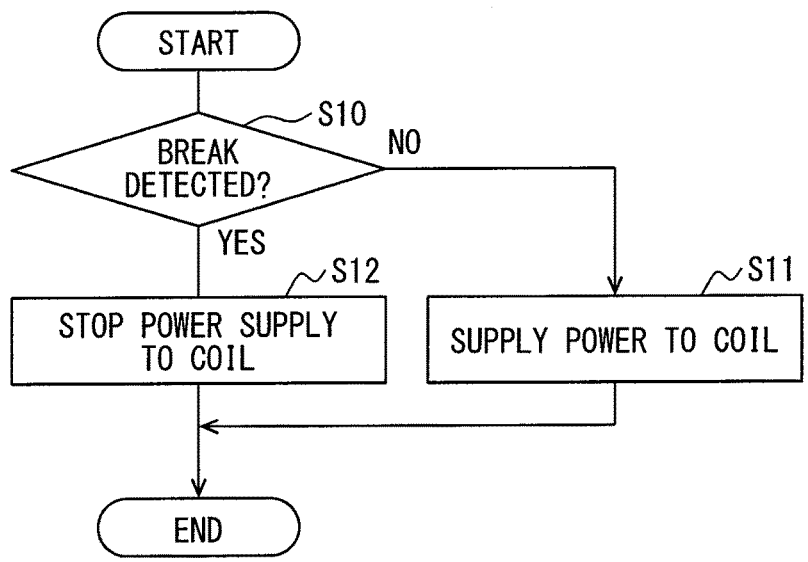
FIG. 3 is a flow chart illustrating a processing of a break detector of the first embodiment.

The control part 34 of the controller 30 may perform the processing shown in FIG. 3, instead of the break detector 48. The control part 34 may correspond to an operation part.

In the first embodiment, a relay which configures the contactor 45 and the safety switch 46 may be replaced with a semiconductor switch such as MOSFET.

The base portion 11 of the robot 10 is not restricted to be put on the movable member, and may be arranged to a fixed (not movable) floor. In this case, a power line may be pulled and broken. In such a case, the present disclosure is effective.

The motor may be an induction motor, not restricted to the synchronous motor.

The robot may be a horizontal multi-joint type robot, and is not limited to the vertical multi-joint type robot.

Such changes and modifications are to be understood as being within the scope of the present disclosure as defined by the appended claims.

What is claimed is:
1. A robot system comprising:
   a robot including
      a base portion,
      a plurality of rotation parts connected rotatably relative to the base portion, and
      a three-phase motor arranged to drive a rotation shaft of the respective rotation part;
   a three-phase inverter having a high side switch and a low side switch connected in series;
   a three-phase power line electrically connecting a connection point between the high side switch and the low side switch to a stator winding of the motor, the power line connecting the inverter and the stator winding through a lead-in port of the base portion;
   a short circuit path that electrically connects at least two lines of the three-phase power line, the short circuit path being located between the stator winding and the lead-in port;
   a brake switch arranged in the short circuit path to change the short circuit path to an open state or a closed state;
   a break detector that detects a disconnection of the power line; and an auxiliary switch that operates the brake switch from the open state to the closed state, when the break detector detects the disconnection.

2. The robot system according to claim 1, wherein
the short circuit path electrically connects at least two phase lines of the three-phase power line, and
the at least two phase lines are respectively connected to stator windings of the motor.

3. The robot system according to claim 2, further comprising:
an interception switch disposed between the lead-in port and the short circuit path in each line of the three-phase power line to change the each line to an open state or a closed state, wherein
the auxiliary switch operates the interception switch from the closed state to the open state, when the break detector detects the disconnection of the power line.

4. The robot system according to claim 3, wherein:
the auxiliary switch is mechanically interlocked with the interception switch to open and close, such that the auxiliary switch is closed when the interception switch is in the open state, and the auxiliary switch is open when the interception switch is in the closed state,
the interception switch is a normally open-type switch, the interception switch being closed when electric power is supplied to an interception magnetization coil while the interception switch is open when electric supply is not supplied to the interception magnetization coil,
the brake switch is a normally open-type switch and connected to a brake magnetization coil, the brake switch being closed in response to electric power being supplied to the brake magnetization coil, and the brake switch is open in response to electric supply being not supplied to the brake magnetization coil,
a closed circuit to include a direct-current power supply, the auxiliary switch, and the brake magnetization coil, and
the auxiliary switch intercepts a supply of electric power to the interception magnetization coil, when the break detector detects the disconnection.

5. The robot system according to claim 2, wherein
the short circuit path electrically connects three phase lines of the power line, and
the three phase lines are respectively connected to stator windings of the motor.

6. The robot system according to claim 1, wherein
the three-phase motor is a first motor which drives the rotation shaft of a first rotation part of the plurality of rotation parts,
the three-phase inverter is a first inverter arranged to correspond to the first motor,
the three-phase power line is a first three-phase power line electrically connecting a first stator winding of the first motor to the connection point between the high side switch and the low side switch of the first inverter,
the robot system further comprising:
a second motor which drives the rotation shaft of a second rotation part of the plurality of rotation parts;
a second inverter arranged to correspond to the second motor; and
a second three-phase power line electrically connecting a second stator winding of the second motor to the connection point between the high side switch and the low side switch of the second inverter, wherein
the break detector detects at least one disconnection of the first three-phase power line and the second three-phase power line, and
the short circuit path electrically connects at least two phase lines of the first power line to at least two phase lines of the second power line, respectively, without an overlap.

7. The robot system according to claim 6, further comprising:
a first interception switch disposed between the lead-in port and the short circuit path in each line of the first three-phase power line to change the each line to the open state or the closed state; and
a second interception switch disposed between the lead-in port and the short circuit path in each line of the second three-phase power line to change the each line to the open state or the closed state, wherein
the auxiliary switch operates the first interception switch and the second interception switch from the closed state to the open state, when the break detector detects the disconnection.

8. The robot system according to claim 7, wherein:
the auxiliary switch is mechanically interlocked with a target switch to open and close, the target switch being at least one of the first interception switch and the second interception switch, such that the auxiliary switch is closed when the target switch is in the open state, and the auxiliary switch is open when the target switch is in the closed state,
each of the first interception switch and the second interception switch is a normally open-type switch that is: (i) closed when electric power is supplied to an interception magnetization coil, and (ii) open when electric supply is not supplied to the interception magnetization coil,
the brake switch is a normally open-type switch and connected to a brake magnetization coil, the brake switch being closed in response to electric power being supplied to the brake magnetization coil, and the brake switch is open in response to electric supply being not supplied to the brake magnetization coil,
a closed circuit to include a direct-current power supply, the auxiliary switch, and the brake magnetization coil, and
the auxiliary switch intercepts a supply of electric power to the interception magnetization coil, when the break detector detects the disconnection.

9. The robot system according to claim 6, wherein the short circuit path electrically connects three phase lines of the first power line to three phase lines of the second power line, respectively, without an overlap.

* * * * *